April 15, 1941. W. J. WOODS 2,238,204
METHOD AND APPARATUS FOR THE PRODUCTION OF FINE FILAMENTS OF GLASS
Filed April 22, 1937 2 Sheets-Sheet 1

INVENTOR.
WILLIAM J. WOODS
BY Dorsey, Cole & Turner
ATTORNEYS.

April 15, 1941.  W. J. WOODS  2,238,204
METHOD AND APPARATUS FOR THE PRODUCTION OF FINE FILAMENTS OF GLASS
Filed April 22, 1937  2 Sheets-Sheet 2
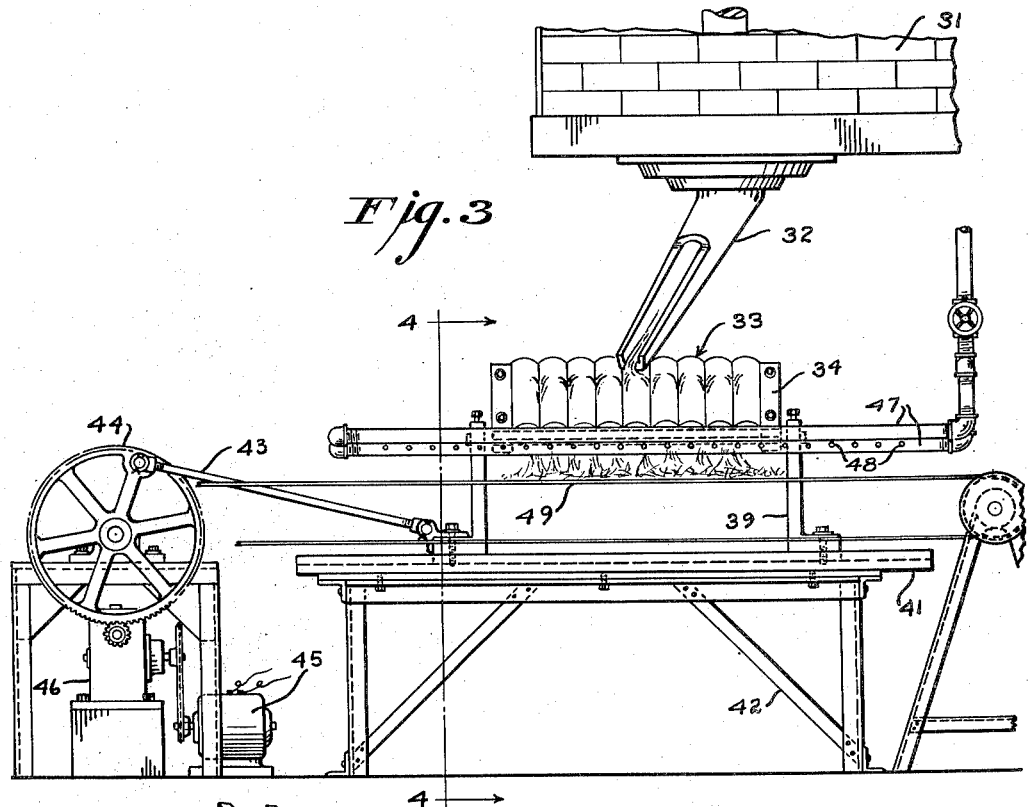
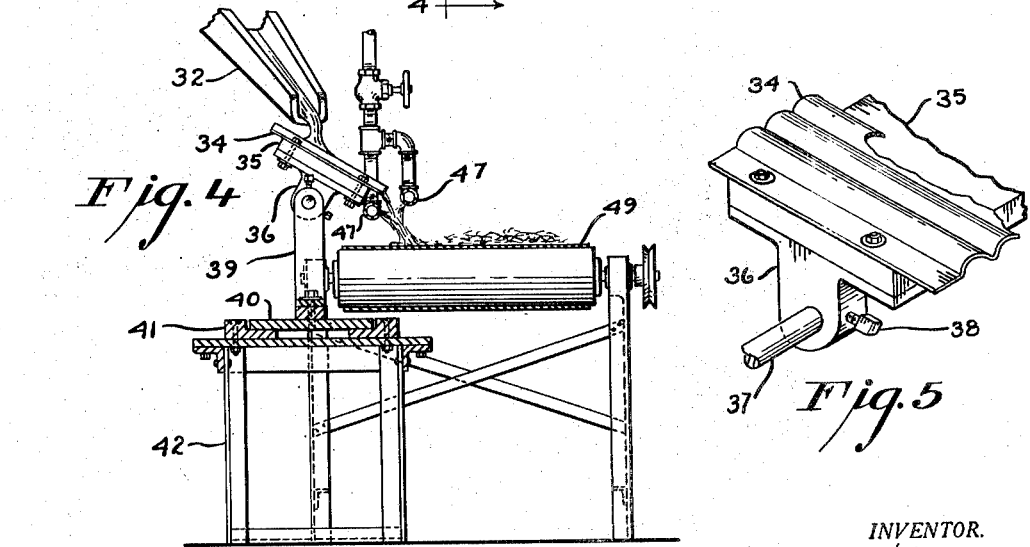
INVENTOR.
WILLIAM J. WOODS
BY Dorsey, Cole & Garner
ATTORNEYS.

Patented Apr. 15, 1941

2,238,204

UNITED STATES PATENT OFFICE 2,238,204

METHOD AND APPARATUS FOR THE PRODUCTION OF FINE FILAMENTS OF GLASS

William J. Woods, Corning, N. Y., assignor, by mesne assignments, to Owens-Corning Fiberglas Corporation, a corporation of Delaware Application April 22, 1937, Serial No. 138,407

6 Claims. (Cl. 83—91)

This invention relates to the production of fine fibres from molten materials. More particularly this invention includes a method and apparatus for the production of fine filaments of glass such as are termed glass wool.

The principal object of my invention is to divide a body of molten glass into a plurality of fine streams of equal magnitude which may be further subdivided and attenuated into filaments of very small diameter.

To this end I have devised a number of different structures which have as a common feature of novelty a ribbed, fluted or corrugated glass receiving surface so positioned that when molten glass is placed thereon it will tend to flow under the influence of gravity in a direction lengthwise of the ribs of the corrugated member thereby automatically dividing into a plurality of fine streams, one such stream being found in each groove of the corrugated member.

Further features of the invention will be apparent on reading the description of my method and structures and the appended claims.

In the accompanying drawings:

Fig. 3 is a side view of another form of apparatus according to my invention;

Fig. 4 is a sectional view taken along the line 4—4 of Fig. 3; and

Fig. 5 is a perspective view of a portion of the feeder plate of Figs. 3 and 4 showing its construction and mounting.

Figure 1:
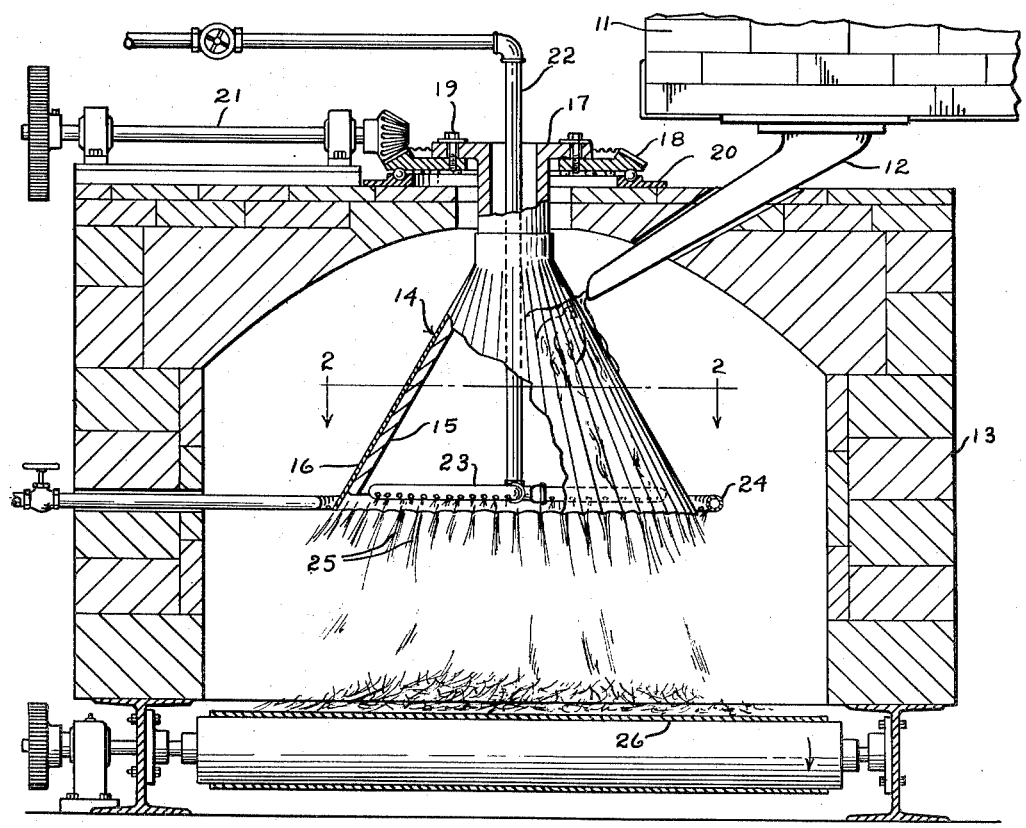
Fig. 1 is a vertical section through one form of my invention.
Figure 2:
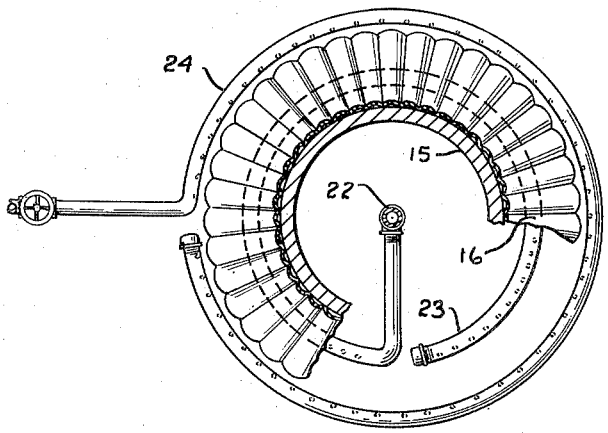
Fig. 2 is a cross section of the conical distributing member taken along the line 2—2 in Fig. 1.

In the first structure embodying my invention which I have illustrated in Figs. 1 and 2, glass is melted to the desired fluidity in a furnace designated 11. This furnace may be designed to remelt glass cullet or to initially melt raw batch as may be desired. The refractory spout 12 conducts highly heated glass from furnace 11 into the interior of muffle 13 adjacent the upper end of the distributor 14. This distributor consists of a hollow cone 15 made of a typical ceramic refractory and a thin ribbed, fluted or corrugated shell 16 of a refractory metal adapted to withstand the abrasive and corrosive action of molten glass. Such metals include the nickel chromium alloys and the noble metals, particularly platinum. The upper end of the cone 15 is joined to a flanged cylinder 17 which is attached to ring gear 18 by bolts 19. This ring gear is rotatably supported on a ball race 20 and is slowly rotated from a suitable source of power through mechanism 21.

A pipe 22, which is connected to a source of fluid pressure, such as a high pressure steam boiler, passes downwardly through the member 17 into the interior of the member 14 where it terminates in a blower 23 located adjacent the lower edge of the fluted shell 16. This blower is designed to direct jets of fluid at high velocity against the under surface of the edge portion of the shell in a direction more or less parallel thereto. A similar blower 24 encircles the shell adjacent the lower edge thereof. High speed jets of fluid from these blowers converge below the edge of the shell and envelop the fine streams of glass 25 as they leave the edges of the shell 16 and draw them out into a multitude of fine filaments which are deposited on the surface of the take off conveyor 26 positioned beneath the muffle.

In the foregoing structure, glass in a highly heated and relatively fluid condition flows from the melting furnace 11 through spout 12 into the muffle chamber where it is deposited on the surface of the slowly rotating distributor 14. The speed of rotation of this member and the rate of flow of the glass are so controlled as to produce a substantially uniform flow of glass at all points around the lower edge of the cone. As will be observed the hot glass is deposited on the upper portion of the distributor in a substantially uniform layer. As it flows downwardly over the fluted shell 16 it first spreads out in a thinner layer which in turn divides into a series of fine streams located in the grooves of the fluted shell. These fine streams serve as roots from which filaments are drawn by the jets of fluid issuing from the blower. Variation in the speed of rotation of the distributor and rate of flow of the glass will result in variation of the fibre diameter and the rate of production of glass wool.

The further embodiment of my invention which is shown in Figs. 3-5 employs an oblong corrugated feeder plate 33 to receive and distribute the molten glass in place of the rotary distributor of Figs. 1 and 2. In this structure glass is melted in a suitable furnace 31 from which it flows through a spout 32 to the feeder structure 33. This feeder is composed of a corrugated sheet of refractory metal 34 supported on a strip of ceramic refractory 35, the two being bolted together and to brackets 36. The brackets 36 are in turn mounted on shaft 37 and are adjustably secured thereto by set screws 38. Shaft 37 is supported by brackets 39 which are mounted on a bed plate 40. Guide rails 41 and a supporting framework 42 provide a mounting on which the bed plate moves back and forth under the influence of connecting rod 43 which is pinned to rotating gear 44. This gear is driven at slow speed by a motor 45 acting through gear box 46.

As in the case of my conical distributor, molten glass deposited on the feeder plate 33 flows down its corrugated surface under the influence of gravity, dividing into fine streams located in the trough of each corrugation. The reciprocatory movement which is imparted to the feeder plate by the driving mechanism insures uniform delivery of glass to its entire length. Fluid jets to pull the fine streams of glass into filaments are provided by a pair of pipes 47 located adjacent the lower edge of the feeder plate 33. The holes 48 through which these jets issue are so directed as to cause convergence of the jets on the fine streams of glass shortly after they leave the feeder plate. The resulting filaments are collected and removed by a continuously moving conveyor 49.

It is to be noted that the angle of inclination of the feeder plate may be adjusted at will, thereby providing means for regulating the rate of flow of the glass to the blowers in addition to the usual controls of furnace outlet and rate of reciprocation so that an extremely flexible control of fibre size and rate of production is available. In both structures the relative movement of the feeder with respect to the jets issuing from the blower produces a whipping and drawing of the fine streams of glass which is most beneficial from the standpoint of production.

While I have disclosed preferred forms of my invention, it is obvious that various modifications may be made in these structures should they prove desirable. While no heating elements have been provided either in muffle 13 or adjacent feeder plate 33, any suitable source of heat may be availed of if it is desired to lower the viscosity of the glass on the surface of the feeder or distributor. If desired, the feeder plate of Figs. 3-5 may be mounted on a fixed support and proper distribution of glass obtained by oscillation of the spout 32. If difficulty is experienced in retaining the glass filaments on the conveyor belt, a suction box may be fitted beneath the upper stream adjacent the feeder thereby drawing the filaments down into a more compact felted mass on the surface of the conveyor.

Further modifications may be resorted to within the scope of the appended claims.

I claim:

1. The method of producing fibres from molten glass which comprises supplying glass in individual fine streams, passing said streams between a series of impinging jets of gases of high velocity to attenuate the same and continuously effecting relative transverse movement between said streams and jets during attenuation of the streams.

2. In apparatus for the production of fibres from molten glass, an inclined glass distributing device, stationary means for supplying molten glass thereto, means for reciprocating said distributing device whereby a coating of glass is deposited along the surface thereof, means for varying the angle of inclination of the distributing device to control the flow therefrom, and means for impinging high velocity gas upon the glass as it flows from said distributing device.

3. In apparatus for the production of fibres from molten siliceous material, a rotatable distributing member of conical shape having a downwardly and outwardly inclined radially fluted surface, means for flowing a stream of molten material from a supply body onto the surface of the distributing member at a substantial distance from the lower edge thereof, means for rotating the distributing member to cause the molten material to be evenly distributed and to form a substantially continuous layer thereon and to be divided by the flutes into a plurality of small streams as it flows downwardly over the conical surface, and attenuating means beneath the distributing member in the form of blowers arranged to direct converging blasts on the streams flowing from the distributing member in their general direction of flow to attenuate the same into fibres.

4. In apparatus for the production of fibres from molten siliceous material, a rotatable distributing member of conical shape having a downwardly and outwardly inclined radially fluted surface, means for flowing a stream of molten material from a supply body onto the surface of the distributing member at a substantial distance from the lower edge thereof, means for rotating the distributing member to cause the material to be evenly distributed and to form a substantially continuous layer thereon and to be divided by the flutes into a plurality of small streams as it flows downwardly over the conical surface, attenuating means beneath the distributing member in the form of blowers arranged to direct blasts on the streams flowing from the distributing member to attenuate the same into fibres, and a foraminous arresting surface beneath said distributing member on which the fibres are deposited.

5. In apparatus for the production of fibres from molten glass, a rotatable distributing member of conical shape having a downwardly and outwardly inclined radially fluted surface, means for flowing a stream of molten glass from a supply body onto the surface of the distributing member at a substantial distance from the lower edge thereof, means for causing relative movement between the distributing member and the stream to cause the molten glass from the supply body to be distributed evenly on said member, said relative movement being effected at a speed that will permit the molten glass to form a substantially continuous layer on said member and to be divided by the flutes into a plurality of small streams as it flows downwardly over the conical surface, attenuating means beneath the distributing member in the form of circular blowers about the base of the conical distributing member respectively at opposite sides of the fluted surface and arranged to direct blasts onto the streams flowing from the distributing member to attenuate the same into fibres, and a conveyor beneath the distributing member on which the fibres are deposited in the form of a mat.

6. The method of producing fibres from thermoplastic material which comprises flowing a stream of the material from a molten supply body onto the upper portion of a downwardly and outwardly inclined radially fluted surface, effecting relative movement between said surface and the stream to cause the molten material to be deposited evenly thereover and to form a substantially continuous layer thereon, flowing the material along said surface to cause the flutes to divide it into a plurality of fine streams, directing converging blasts on the streams longitudinally thereof as they flow from the lower edge of the surface to attenuate the same into fibres, and depositing said fibres on an arresting surface.

WILLIAM J. WOODS.